US012658631B2

(12) United States Patent
Moriya et al.

(10) Patent No.: US 12,658,631 B2
(45) Date of Patent: Jun. 16, 2026

(54) SOCKET CONNECTOR AND MANUFACTURING METHOD THEREOF

(71) Applicant: Japan Aviation Electronics Industry, Ltd., Tokyo (JP)

(72) Inventors: Miki Moriya, Tokyo (JP); Yuichi Takenaga, Tokyo (JP); Yohei Yokoyama, Tokyo (JP)

(73) Assignee: Japan Aviation Electronics Industry, Ltd., Tokyo (JP)

(*) Notice: Subject to any disclaimer, the term of this patent is extended or adjusted under 35 U.S.C. 154(b) by 236 days.

(21) Appl. No.: 18/331,541

(22) Filed: Jun. 8, 2023

(65) Prior Publication Data

US 2024/0006799 A1 Jan. 4, 2024

(30) Foreign Application Priority Data

Jul. 4, 2022 (JP) ................................ 2022-107992

(51) Int. Cl.

*H01R 13/502* (2006.01)
*H01R 12/70* (2011.01)
*H01R 12/71* (2011.01)

(52) U.S. Cl.

CPC ......... *H01R 13/502* (2013.01); *H01R 12/716* (2013.01); *H01R 12/707* (2013.01)

(58) Field of Classification Search

CPC .................................................... H01R 13/502
USPC .......................................................... 439/660
See application file for complete search history.

(56) References Cited

U.S. PATENT DOCUMENTS

| | | | | |
|---|---|---|---|---|
| 2019/0363467 A1* | 11/2019 | Ko | | H01R 13/26 |
| 2022/0131306 A1* | 4/2022 | Kobayashi | | H01R 13/504 |
| 2023/0006381 A1* | 1/2023 | Li | | H01R 12/716 |
| 2023/0066168 A1* | 3/2023 | Omodachi | | H01R 13/502 |
| 2023/0396012 A1* | 12/2023 | Tanaka | | H01R 13/502 |

FOREIGN PATENT DOCUMENTS

| | | |
|---|---|---|
| JP | 2009283357 A | 12/2009 |
| JP | 2022-070391 A | 5/2022 |

OTHER PUBLICATIONS

Japanese Office Action for Japan Application 2022-107992, dated Dec. 16, 2025, with Machine Translation.
Office Communication issued on Apr. 21, 2026 in the counterpart JP Patent Application No. 2022-107992.

* cited by examiner

*Primary Examiner* — Abdullah A Riyami
*Assistant Examiner* — Amara Anderson
(74) *Attorney, Agent, or Firm* — Renner, Otto, Boisselle & Sklar, LLP

(57) ABSTRACT

A socket connector includes a socket housing in which an island part and a peripheral wall surrounding the island part project upward from a bottom plate, a plurality of socket contacts arranged in the socket housing, and two protective metal fittings. In a cutting step, a half-dome part of the two protective metal fittings is formed by cutting a metal plate in such a way that a dome part in a symmetrical shape formed by drawing in the metal plate is split into two halves along a line of symmetry. In a press-fitting step, two press-fitting parts of each socket hold-down are press-fit into two long walls, respectively.

7 Claims, 20 Drawing Sheets

SOCKET CONNECTOR AND MANUFACTURING METHOD THEREOF

INCORPORATION BY REFERENCE

This application is based upon and claims the benefit of priority from Japanese patent application No. 2022-107992, filed on Jul. 4, 2022, the disclosure of which is incorporated herein in its entirety by reference.

BACKGROUND

The present invention relates to a socket connector and a manufacturing method of the same.

As shown in FIG. 20 of the present application, Patent Literature 1 (Japanese Unexamined Patent Application Publication No. 2022-070391) discloses a connector 102 that includes a housing 100 made of insulating resin and two protective members 101 made of metal that are held to the housing 100 by insert molding. The two protective members 101 protect both ends 103A of a center projecting part 103 of the housing 100, respectively.

SUMMARY

In the structure disclosed in Patent Literature 1, the housing 100 and the two protective members 101 are integrated by insert molding, and therefore each protective member 101 is firmly held to the housing 100. This prevents each protective member 101 from coming off the housing 100 when removing an opponent connector from the connector 102, for example.

However, a mold for insert molding needs to be manufactured with significantly high dimensional accuracy and thereby costs very high, and this has been considered to be a cause of inhibiting cost reduction of a connector.

An object of the present disclosure is to provide a technique that achieves both cost reduction of a socket connector and firmly holding, to a housing, a protective metal fitting for protecting an island part of the housing.

According to a first aspect of the present disclosure, there is provided a method of manufacturing a socket connector, the socket connector including a housing in which an island part and a peripheral wall surrounding the island part project upward from a bottom plate; a plurality of contacts arranged in the housing; and two protective metal fittings, the peripheral wall including two long walls extending in a pitch direction of the plurality of contacts, and each of the protective metal fittings including a protective part placed at an island end part being an end of the island part in the pitch direction for protecting the island end part, two arm parts extending from the protective part toward the two long walls, respectively, and two press-fitting parts placed at distal ends of the two arm parts and to be press-fit into the two long walls, respectively, and the method including a cutting step of forming the protective part of the two protective metal fittings by cutting a metal plate in such a way that a dome part in a symmetrical shape formed by drawing in the metal plate is split into two halves along a line of symmetry; and a press-fitting step of press-fitting the two press-fitting parts into the two long walls, respectively.

According to a second aspect of the present disclosure, there is provided a socket connector including a housing in which an island part and a peripheral wall surrounding the island part project upward from a bottom plate; a plurality of contacts arranged in the housing; and two protective metal fittings, wherein the peripheral wall includes two long walls extending in a pitch direction of the plurality of contacts, each of the protective metal fittings includes a protective part placed at an island end part being an end of the island part in the pitch direction for protecting the island end part, two arm parts extending from the protective part toward the two long walls, respectively, and two press-fitting parts placed at distal ends of the two arm parts and to be press-fit into the two long walls, respectively, and the protective parts of the two protective metal fittings have symmetrical shapes facing each other.

According to the present disclosure, it is capable of achieving both cost reduction of a socket connector and firmly holding, to a housing, a protective metal fitting for protecting an island part of the housing.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

An embodiment of the present disclosure will be described hereinafter with reference to FIGS. 1 to 19.

Figure 1:
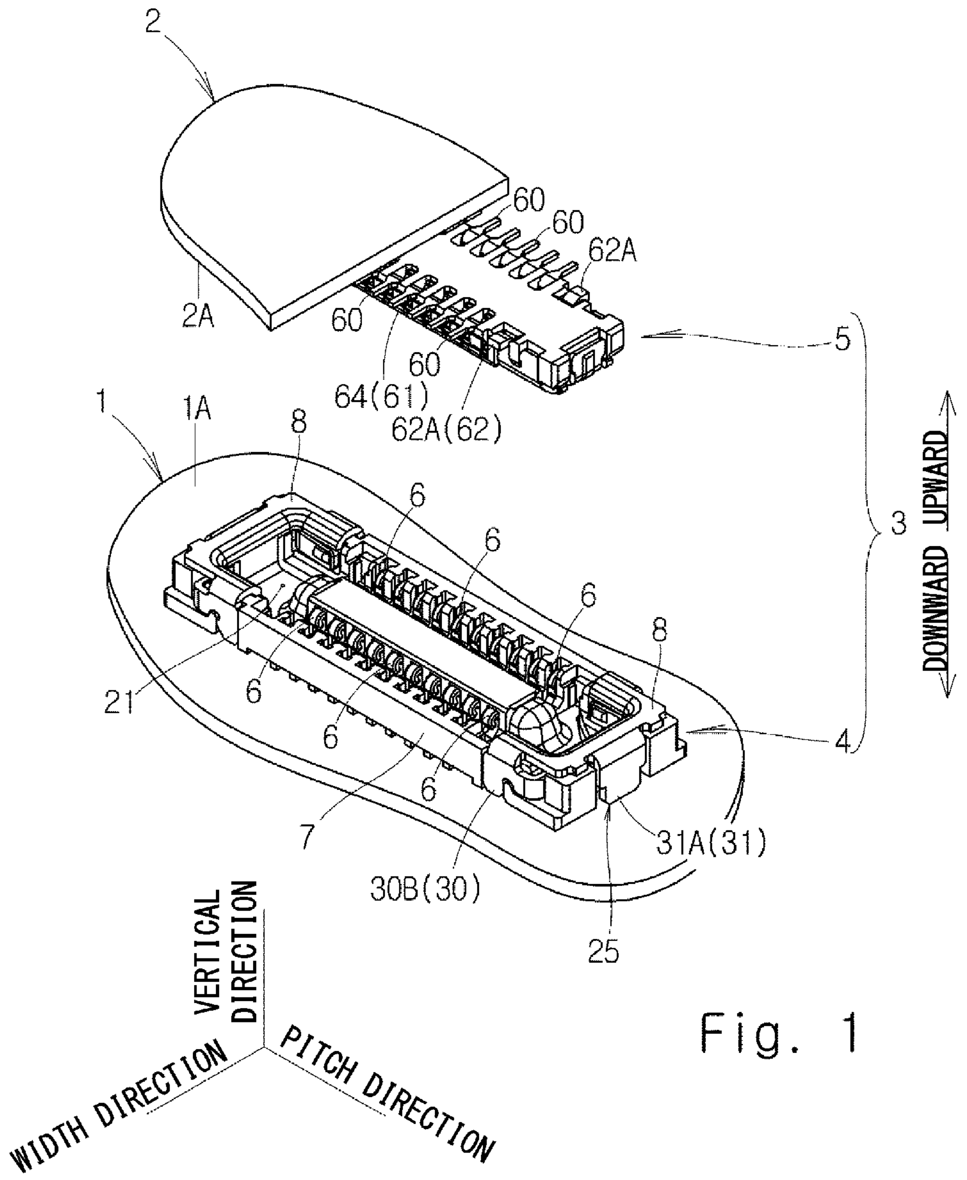
FIG. 1 is a perspective view of a connector assembly.

FIG. 1 shows a connector assembly 3 that mechanically and electrically connect a socket side board 1 and a plug side board 2 that are parallel to each other. The connector assembly 3 includes a socket connector 4 (first connector) to be mounted by soldering on a connector mounting surface 1A of the socket side board 1, and a plug connector 5 (second connector) to be mounted by soldering on a connector mounting surface 2A of the plug side board 2. The socket connector 4 is also called a receptacle connector.

Figure 2:
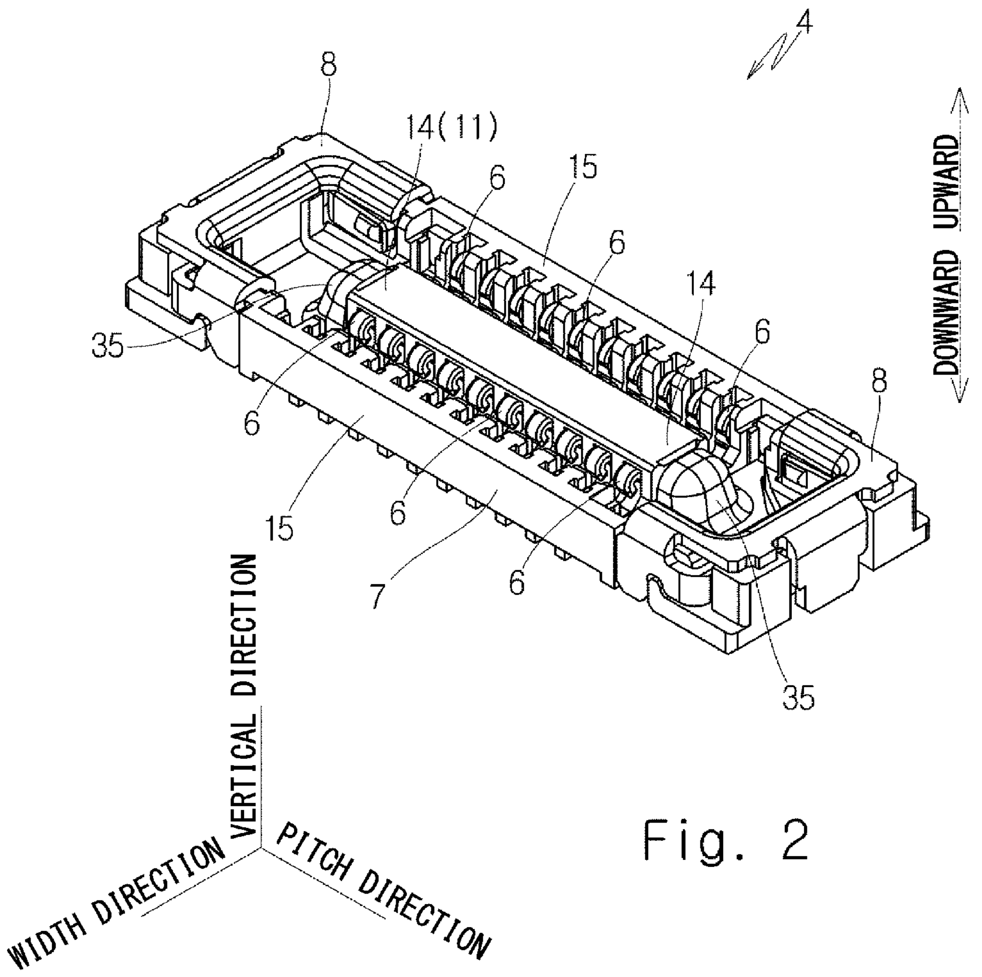
FIG. 2 is a perspective view of a socket connector.
Figure 3:
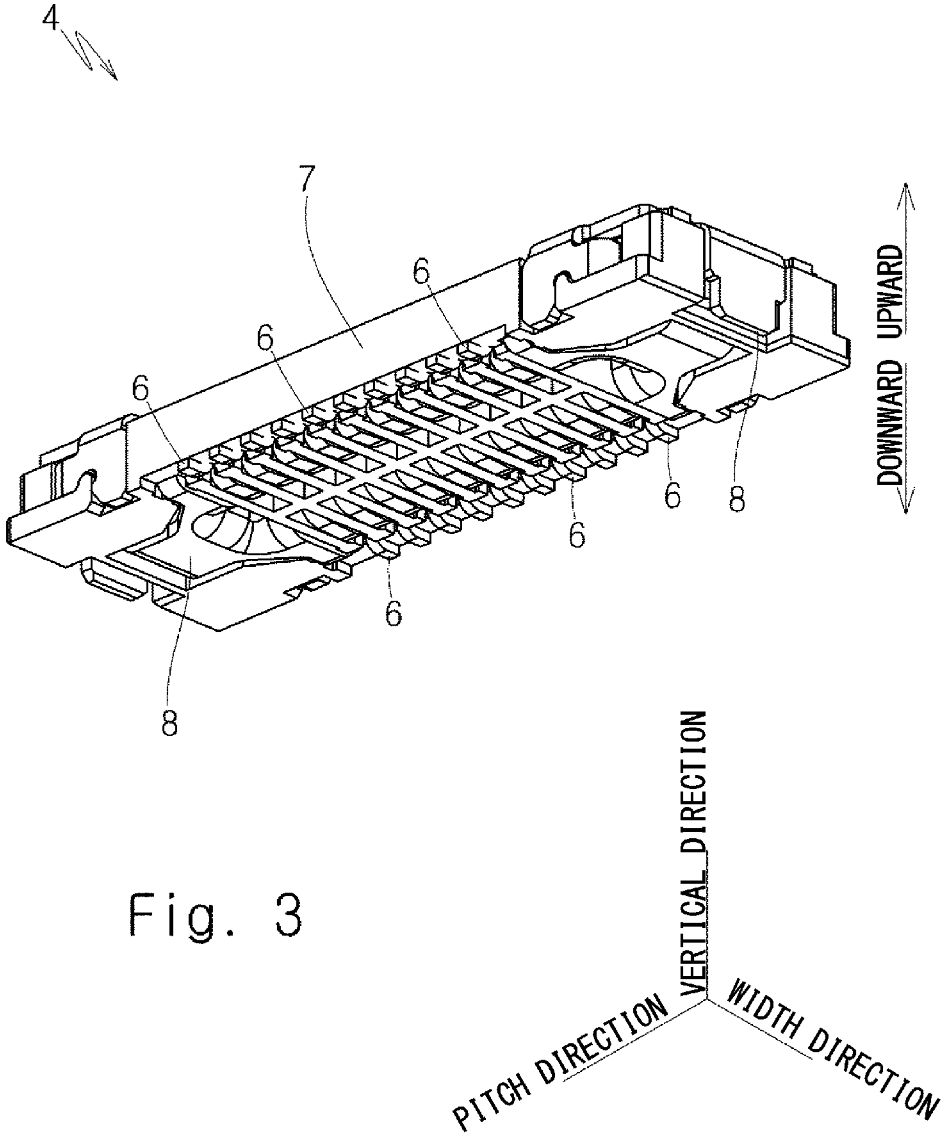
FIG. 3 is a perspective view of the socket connector viewed from another angle.
Figure 4:
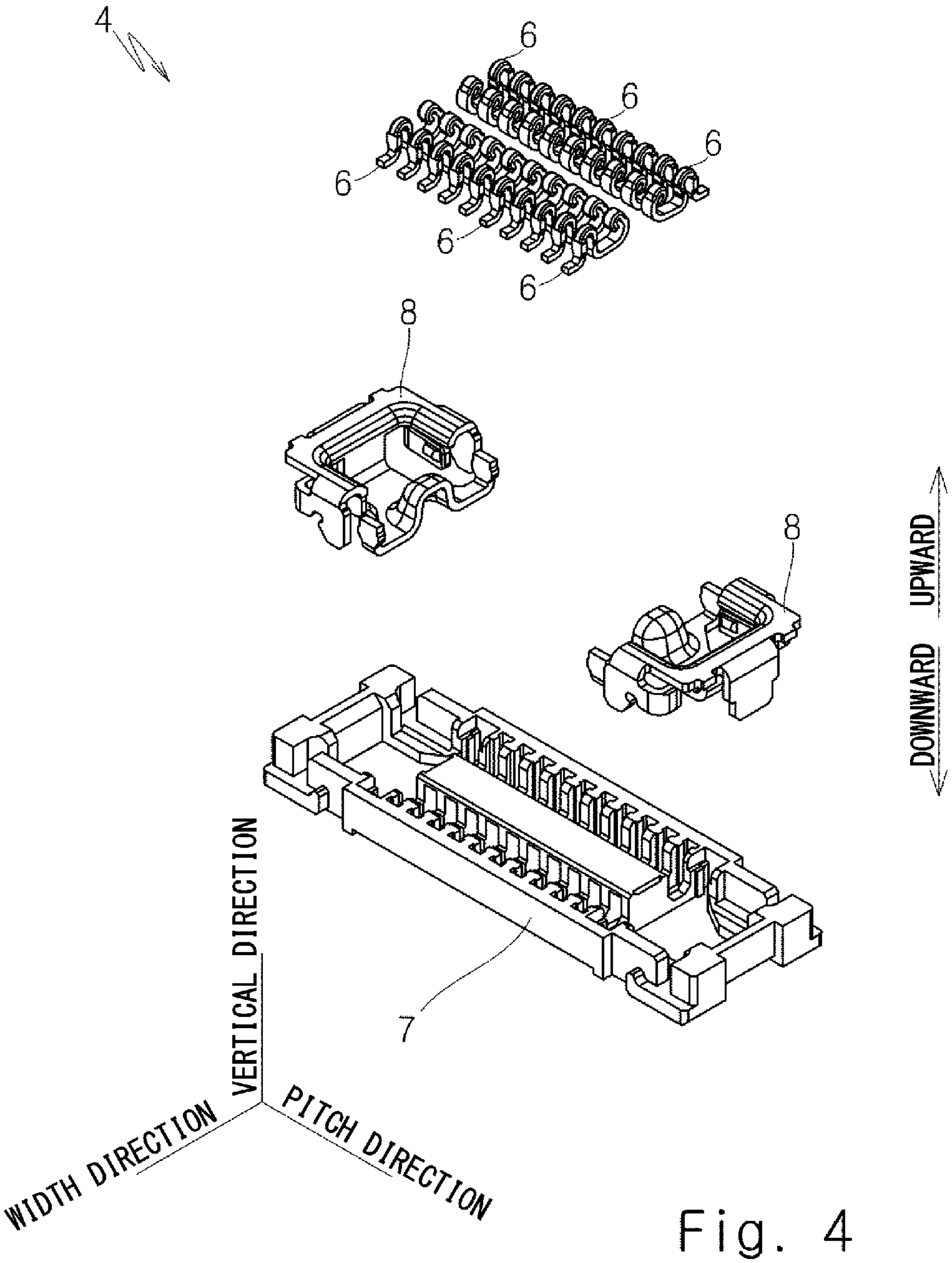
FIG. 4 is an exploded perspective view of the socket connector.

As shown in FIGS. 2 to 4, the socket connector 4 includes a plurality of socket contacts 6 (contacts), a socket housing 7 (housing) that holds the plurality of socket contacts 6, and two socket hold-downs 8.

As shown in FIG. 1, the plurality of socket contacts 6 are arranged in two rows parallel to each other in a direction parallel to the connector mounting surface 1A of the socket side board 1. The two socket hold-downs 8 are mainly used to fix the socket housing 7 to the connector mounting surface 1A of the socket side board 1.

Referring now to FIG. 1, a "vertical direction", a "pitch direction" and a "width direction" are defined. The vertical direction, the pitch direction, and the width direction are perpendicular to each other.

As shown in FIG. 1, the vertical direction is a direction in which the plug connector 5 is inserted into and removed from the socket connector 4. Therefore, the vertical direction coincides with the height direction of the socket connector 4, and also coincides with the height direction of the plug connector 5. The vertical direction includes an upward direction (a removing direction) and a downward direction (a mating direction). The upward direction is a direction in which the plug connector 5 is removed from the socket connector 4. The downward direction is a direction in which the plug connector 5 is mated with the socket connector 4. The terms "upward" and "downward" are used just for the sake of simplifying the explanation, and do not specify the position of the connector assembly 3 when it is actually used.

The pitch direction is a direction in which the plurality of socket contacts 6 are lined up. In the case where the plurality of socket contacts 6 are arranged in two rows parallel to each other as described in this embodiment, the pitch direction can be defined as a direction in which the plurality of socket contacts 6 belonging to one of the two rows are lined up. The pitch direction includes inward in the pitch direction and outward in the pitch direction. The inward in the pitch direction is a direction toward the center of the socket connector 4 in the pitch direction. The outward in the pitch direction is a direction receding from the center of the socket connector 4 in the pitch direction.

The width direction is a direction perpendicular to the vertical direction and the pitch direction. The width direction includes inward in the width direction and outward in the width direction. The inward in the width direction is a direction toward the center of the socket connector 4 in the width direction. The outward in the width direction is a direction receding from the center of the socket connector 4 in the width direction.

(Socket Connector 4)

Referring to FIGS. 2 to 16, the socket connector 4 will be described hereinafter in detail.

As described above with reference to FIGS. 2 to 4, the socket connector 4 includes the plurality of socket contacts 6, the socket housing 7 that hold the plurality of socket contacts 6, and the two socket hold-downs 8.

Figure 5:
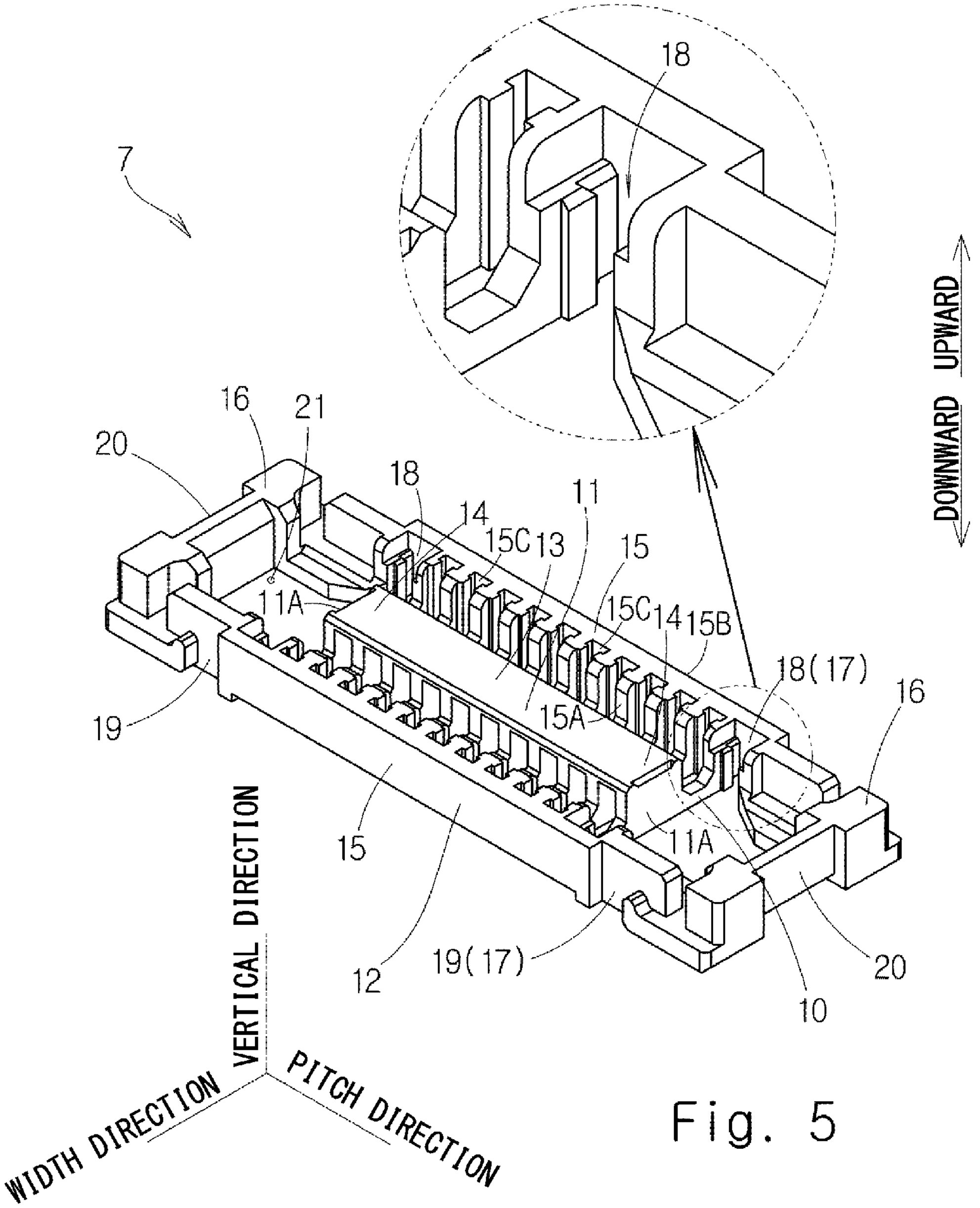
FIG. 5 is a perspective view of a socket housing.
Figure 6:
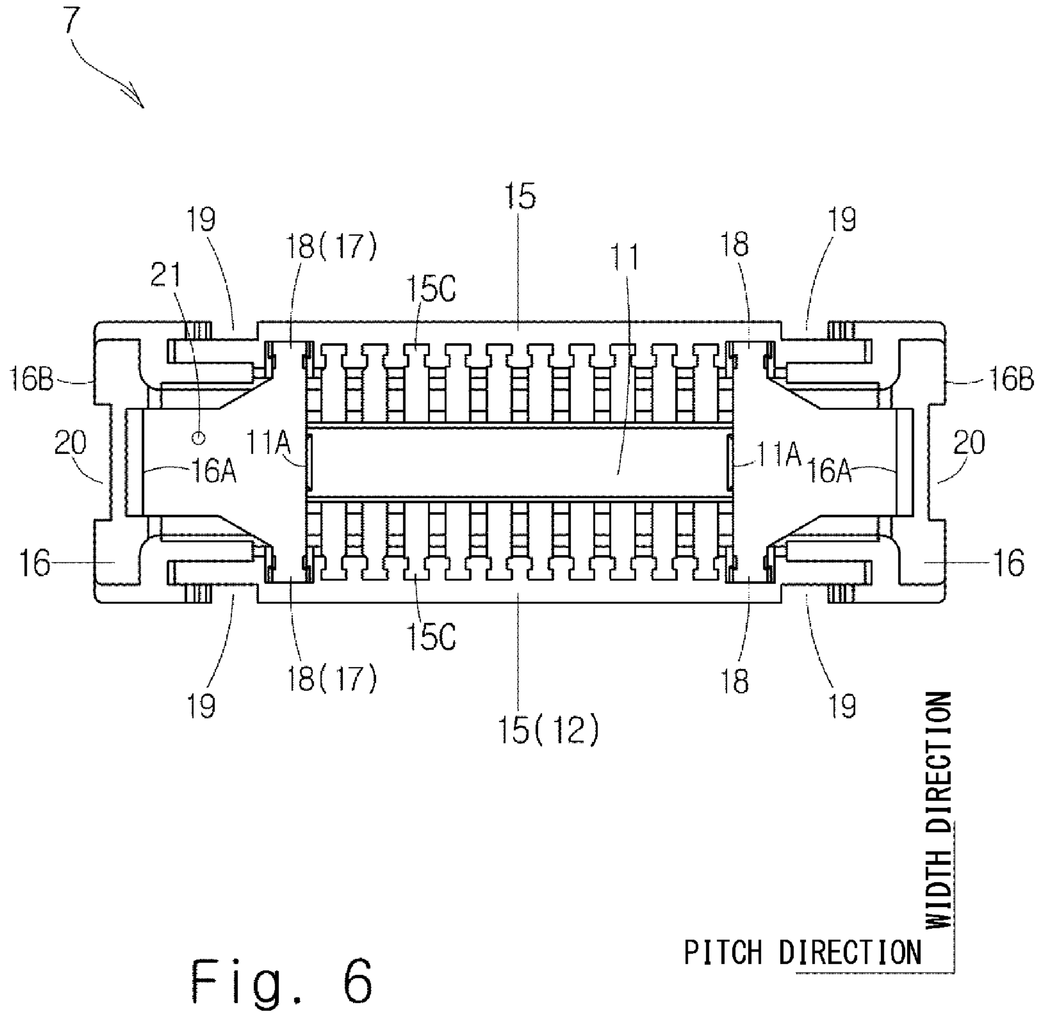
FIG. 6 is a plan view of the socket housing.

As shown in FIGS. 5 and 6, the socket housing 7 is a plate member that is made of an insulating resin and has a rectangular shape when viewed from above, and it is typically formed by injection molding. The socket housing 7 is elongated in the pitch direction. As shown in FIG. 5, the socket housing 7 includes a bottom plate 10, an island part 11, and a peripheral wall 12.

The bottom plate 10 is a flat plate whose thickness direction is in the vertical direction.

The island part 11 projects upward from the center of the bottom plate 10 in the pitch and width directions, and extends in an elongated shape in the pitch direction. The island part 11 includes an island main part 13 and two island end parts 14. The two island end parts 14 respectively correspond to both ends of the island part 11 in the pitch direction. The island main part 13 is a part between the two island end parts 14. The two island end parts 14 are adjacent to the island main part 13 in the pitch direction. As shown in FIGS. 5 and 6, the island part 11 has two end faces 11A facing opposite to each other in the pitch direction.

The peripheral wall 12 is formed in a rectangular annular shape that surrounds the island part 11 when viewed from above. The peripheral wall 12 projects upward from the bottom plate 10. The peripheral wall 12 includes two long walls 15 extending in the pitch direction and two short walls 16 extending in the width direction. The two long walls 15 correspond to two long sides of the socket housing 7. The two short walls 16 correspond to two short sides of the socket housing 7. Thus, the two long walls 15 are disposed between the two short walls 16 in the pitch direction and connect the two short walls 16 to each other. The two short walls 16 are disposed between the two long walls 15 in the width direction and connect the two long walls 15 to each other.

The two long walls 15 are disposed so as to be opposed to the island part 11 in the width direction. The two long walls 15 are disposed away from the island part 11 in the width direction. Each of the long walls 15 has an inner surface 15A facing inward in the width direction and an outer surface 15B facing outward in the width direction. The inner surface 15A of each long wall 15 has a plurality of slits 15C for holding each of the plurality of socket contacts 6. Each long wall 15 has a plurality of press-fitting grooves 17 for holding the two socket hold-downs 8 by press-fitting. As shown in FIG. 6, the plurality of press-fitting grooves 17 include two inner press-fitting grooves 18 and two outer press-fitting grooves 19. Specifically, the inner surface 15A of each long wall 15 has the two inner press-fitting grooves 18, and the outer surface 15B of each long wall 15 has the two outer press-fitting grooves 19.

The two inner press-fitting grooves 18 are formed on both sides of the plurality of slits 15C in the pitch direction. Specifically, the two inner press-fitting grooves 18 are disposed outward in the pitch direction of the plurality of slits 15C. The two outer press-fitting grooves 19 are disposed outward in the pitch direction of the two inner press-fitting grooves 18. The two inner press-fitting grooves 18 and the two outer press-fitting grooves 19 are formed to vertically penetrate the long walls 15. Specifically, the two inner press-fitting grooves 18 and the two outer press-fitting grooves 19 are formed to open upward and downward.

The two short walls 16 are disposed so as to be opposed to the island part 11 in the pitch direction. The two short walls 16 are disposed away from the island part 11 in the pitch direction. Each of the short walls 16 has an inner surface 16A facing inward in the pitch direction and an outer surface 16B facing outward in the pitch direction. The outer surface 16B of each short wall 16 has a soldering leg accommodation groove 20.

Further, the peripheral wall 12 is formed annularly with spaces from the island part 11 in the pitch and width directions, so that an annular mating recessed part 21 is formed between the island part 11 and the peripheral wall 12.

FIGS. 7 to 10 show the socket hold-down 8 observed from various angles. In this embodiment, the two socket hold-downs 8 are disposed to face opposite to each other in the pitch direction. The two socket hold-downs 8 have the same shape, and therefore one socket hold-down 8 will be described hereinafter, and description of the other one will be omitted.

Figure 7:
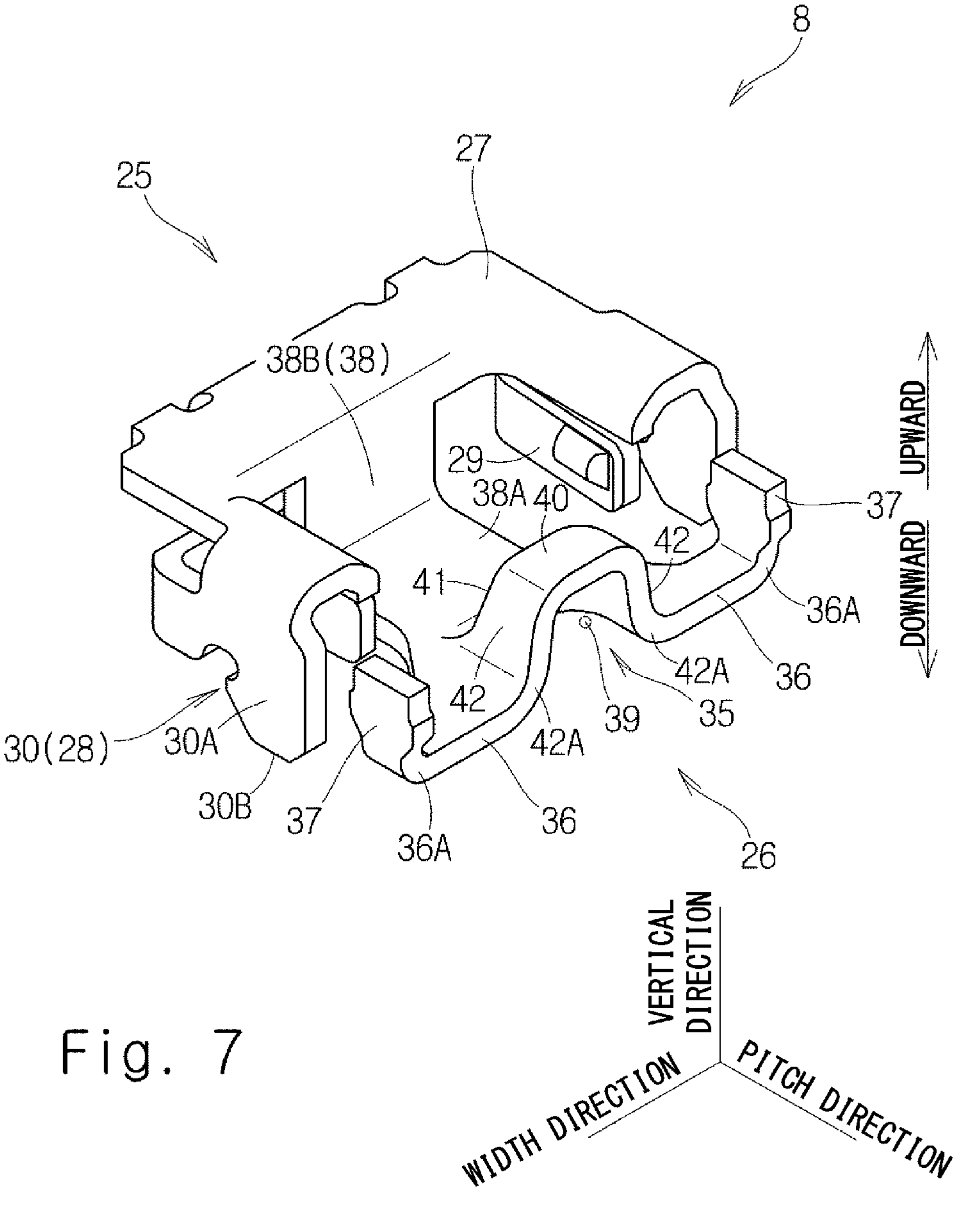
FIG. 7 is a perspective view of a socket hold-down.
Figure 8:
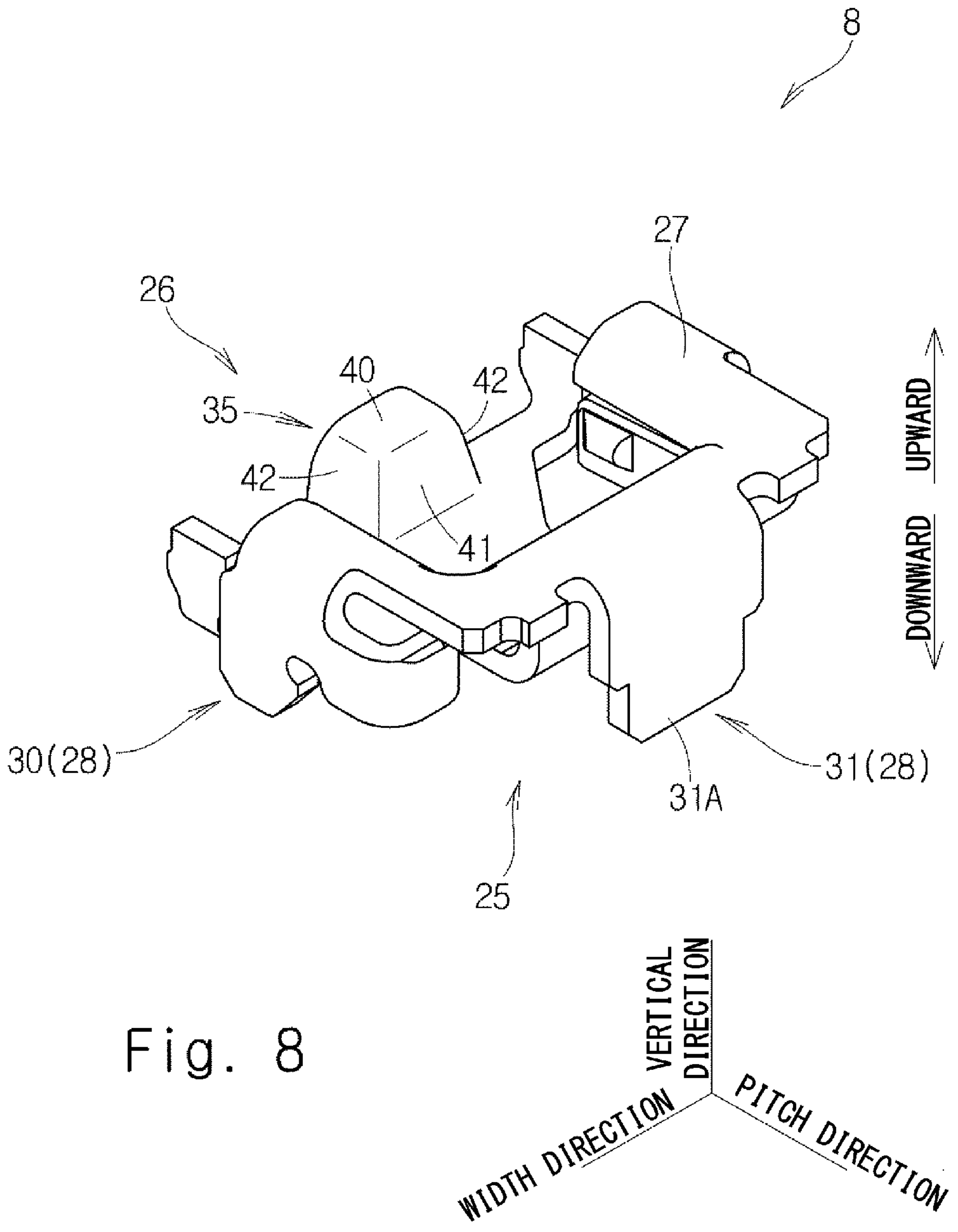
FIG. 8 is a perspective view of the socket hold-down viewed from another angle.

As described earlier with reference to FIG. 1, the socket hold-down 8 is to fix the socket housing 7 to the connector mounting surface 1A of the socket side board 1. As shown in FIGS. 7 and 8, the socket hold-down 8 is made of one metal plate by punching, bending, drawing, cutting and the like.

The socket hold-down 8 includes a hold-down main body 25 and a protective metal fitting 26.

As shown in FIGS. 7 and 8, the hold-down main body 25 includes a cover part 27, three soldering legs 28, and two spring pieces 29.

The cover part 27 is a plate body whose thickness direction is parallel to the vertical direction, and it is formed in a U-shape that opens inward in the pitch direction when viewed from above. The cover part 27 covers and protects the short wall 16 shown in FIG. 6.

Referring back to FIGS. 7 and 8, the three soldering legs 28 are formed to extend downward from the cover part 27. The three soldering legs 28 include two press-fitting soldering legs 30 and one insertion soldering leg 31.

Each of the two press-fitting soldering legs 30 is formed to project outward in the width direction from the cover part 27. Each press-fitting soldering leg 30 includes a press-fitting part 30A and a soldering part 30B in this recited order from top to down. The press-fitting part 30A of each press-fitting soldering leg 30 is press-fit into the corresponding outer press-fitting groove 19 of the socket housing 7 shown in FIG. 6. The soldering part 30B of each press-fitting soldering leg 30 is soldered to a pad, which is not shown, placed on the connector mounting surface 1A of the socket side board 1 shown in FIG. 1.

As shown in FIG. 8, the insertion soldering leg 31 is formed to project outward in the pitch direction from the cover part 27. The insertion soldering leg 31 is inserted into the corresponding soldering leg accommodation groove 20 of the socket housing 7 shown in FIG. 6. A lower end 31A of the insertion soldering leg 31 is soldered to a pad, which is not shown, placed on the connector mounting surface 1A of the socket side board 1 shown in FIG. 1.

The two spring pieces 29 are supported like a cantilever beam by the two press-fitting soldering legs 30, respectively, and extend inward in the pitch direction. Each of the spring pieces 29 is elastically displaceable in the width direction.

As shown in FIG. 7, the protective metal fitting 26 includes a half-dome part 35 (protective part), two lateral arm parts 36 (arm parts), two press-fitting parts 37, and one rear arm part 38.

As shown in FIGS. 7 and 8, the half-dome part 35 has a half-dome shape, which is one-half of a dome opening downward and divided in halves in the pitch direction. Thus, the half-dome part 35 opens downward and also opens inward in the pitch direction. The half-dome part 35 has an internal space 39. The half-dome part 35 includes a top plate 40, a main side plate 41, and two sub-side plates 42. The top plate 40 is disposed above the internal space 39 and thereby partitions the internal space 39. The main side plate 41 is disposed outward in the pitch direction of the internal space 39 and thereby partitions the internal space 39 in the pitch direction. The two sub-side plates 42 are disposed outward in the width direction of the internal space 39 and thereby partition the internal space 39 in the width direction. As shown in FIG. 2, the half-dome part 35 of each socket hold-down 8 is disposed to be adjacent in the pitch direction to each island end part 14 of the island part 11 and thereby protects each island end part 14 of the island part 11. Alternatively, the half-dome part 35 of each socket hold-down 8 may be disposed to cover each island end part 14 of the island part 11 and thereby protect each island end part 14 of the island part 11.

Figure 9:
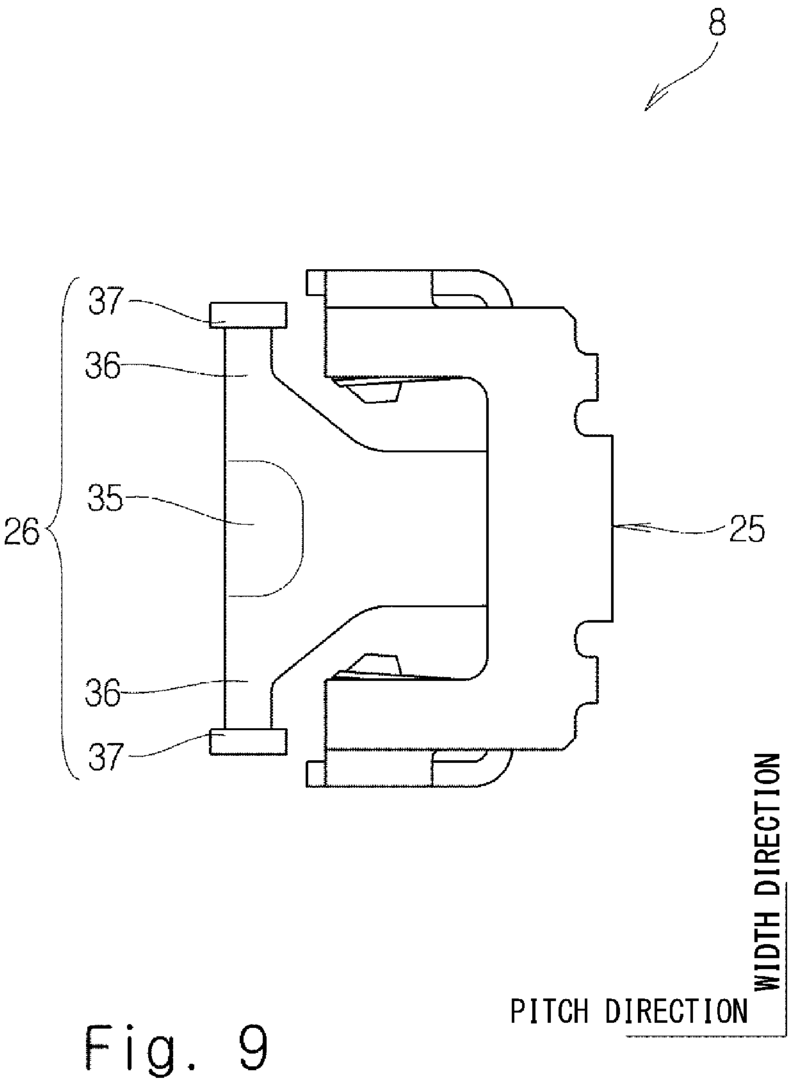
FIG. 9 is a plan view of the socket hold-down.

Referring back to FIGS. 7 and 8, the two lateral arm parts 36 extend outward in the width direction from lower ends 42A of the two sub-side plates 42 of the half-dome part 35, respectively. Specifically, the two lateral arm parts 36 extend from the half-dome part 35 toward the two long walls 15, respectively. As shown in FIG. 9, the two lateral arm parts 36 extend along the width direction.

Figure 10:
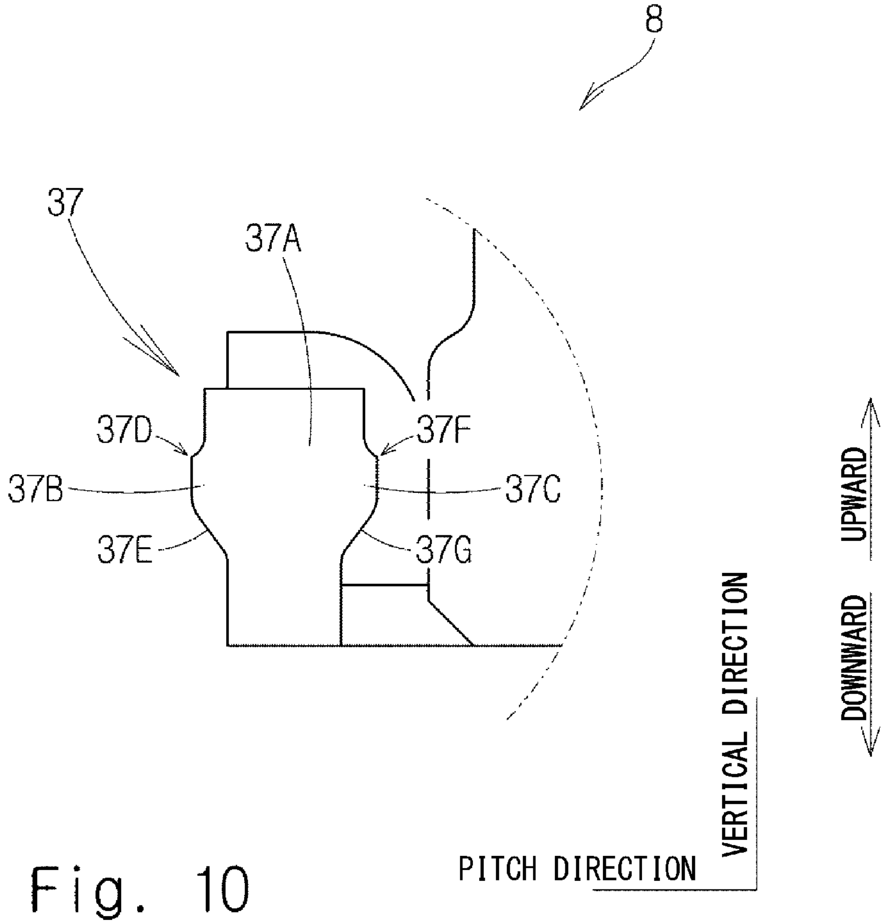
FIG. 10 is a side view of the socket hold-down.

As shown in FIG. 7, the two press-fitting parts 37 are placed at distal ends 36A of the two lateral arm parts 36, respectively. The two press-fitting parts 37 are formed to project upward from the distal ends 36A of the two lateral arm parts 36. The two press-fitting parts 37 are press-fit into the two inner press-fitting grooves 18 shown in FIG. 6, respectively. As shown in FIG. 10, each press-fitting part 37 includes a press-fitting main part 37A extending vertically, an internal press-fitting claw 37B projecting inward in the pitch direction from the press-fitting main part 37A, and an external press-fitting claw 37C projecting outward in the pitch direction from the press-fitting main part 37A. Specifically, the press-fitting part 37 includes the internal press-fitting claw 37B and the external press-fitting claw 37C projecting opposite to each other in the pitch direction. The internal press-fitting claw 37B has a stopper corner 37D and an inclined surface 37E in this recited order from top to down. The inclined surface 37E is inclined outward in the pitch direction as it goes downward. Likewise, the external press-fitting claw 37C has a stopper corner 37F and an inclined surface 37G in this recited order from top to down. The inclined surface 37G is inclined inward in the pitch direction as it goes downward. Thus, the internal press-fitting claw 37B and the external press-fitting claw 37C of each press-fitting part 37 have the inclined surface 37E and the inclined surface 37G that are inclined to approach each other as it goes downward. In other words, each press-fitting part 37 has an arrowhead shape facing downward, and it is designed to press-fit downward into each inner press-fitting groove 18 shown in FIG. 5.

As shown in FIG. 7, the rear arm part 38 joins the protective metal fitting 26 to the cover part 27. Specifically, the rear arm part 38 joins the half-dome part 35 of the protective metal fitting 26 to the cover part 27. The rear arm part 38 includes a horizontal arm part 38A that extends outward in the pitch direction from a lower end of the main side plate 41 of the half-dome part 35 and a vertical arm part 38B that extends upward from a distal end of the horizontal arm part 38A and connects to the cover part 27.

As shown in FIG. 2, each socket contact 6 is disposed to extend from the island part 11 to the long wall 15. Each socket contact 6 is formed by punching and bending one metal plate.

(Manufacturing Method)

Figure 11:
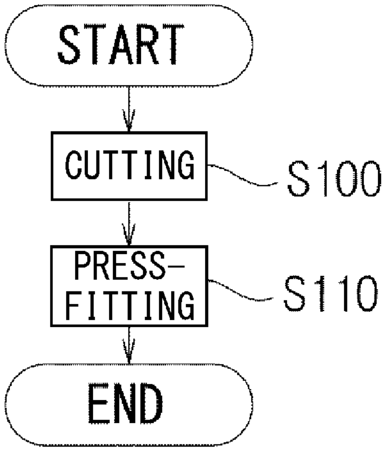
FIG. 11 is a manufacturing flow of a socket connector.

Next, a method of manufacturing the socket connector 4 will be described with reference to FIGS. 11 to 17. FIG. 11 is a flowchart of a method of manufacturing the socket connector 4. As shown in FIG. 11, the method of manufacturing the socket connector 4 includes a cutting step (S100) and a press-fitting step (S110). FIGS. 12 to 15 show a manufacturing process of the two socket hold-downs 8.

Figure 12:
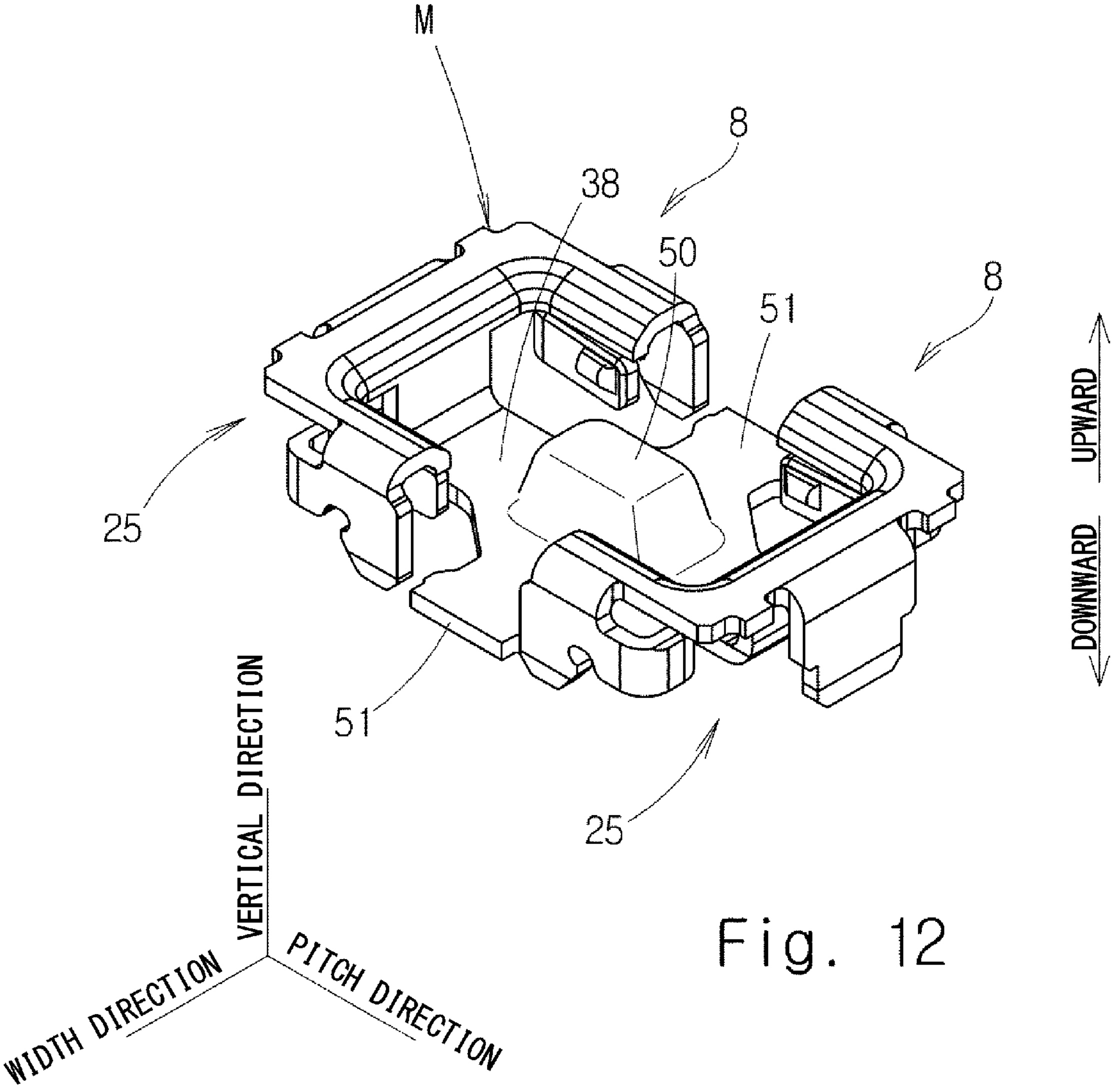
FIG. 12 is a perspective view of a metal plate before cutting.
Figure 13:
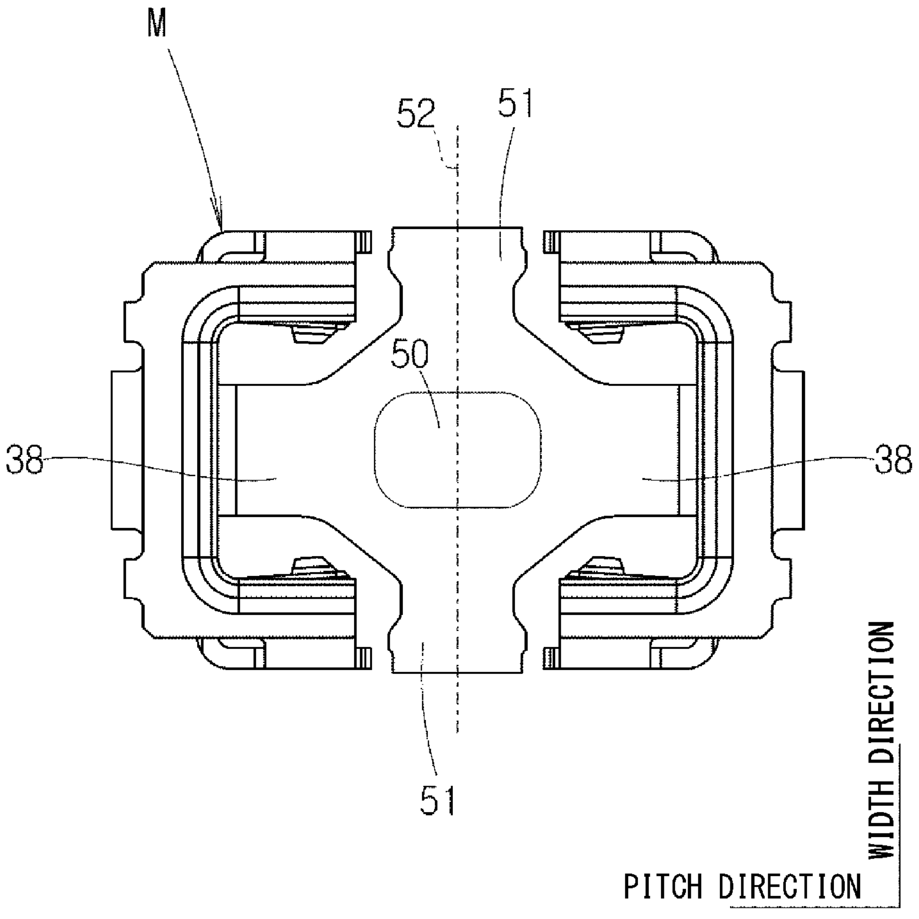
FIG. 13 is a plan view of the metal plate before cutting.
Figure 14:
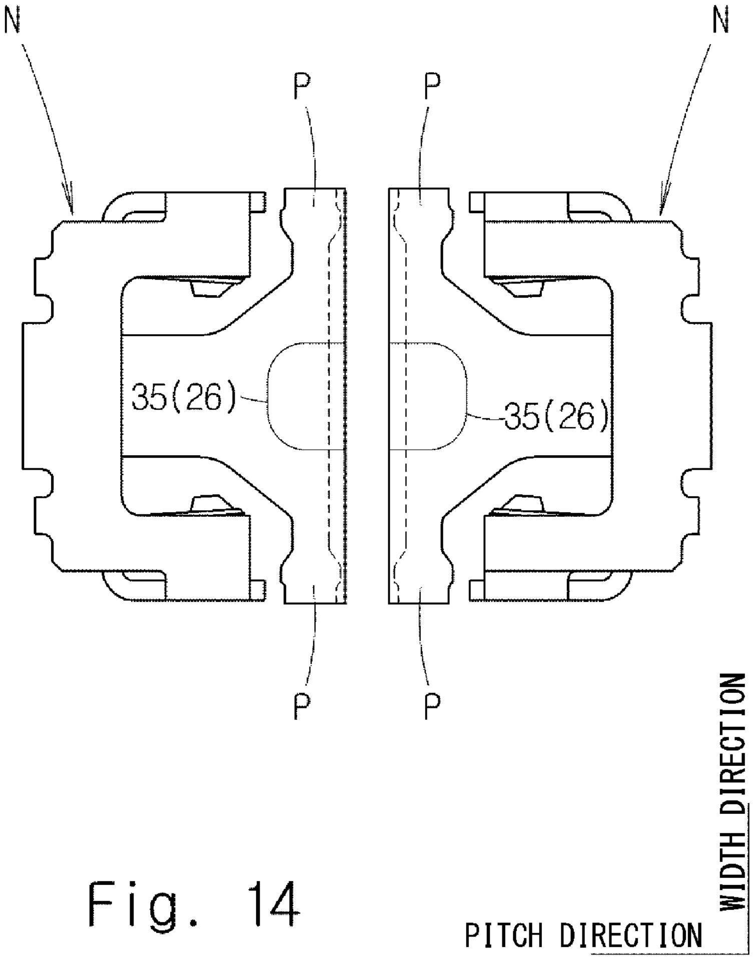
FIG. 14 is a plan view of a metal split body after cutting.
Figure 15:
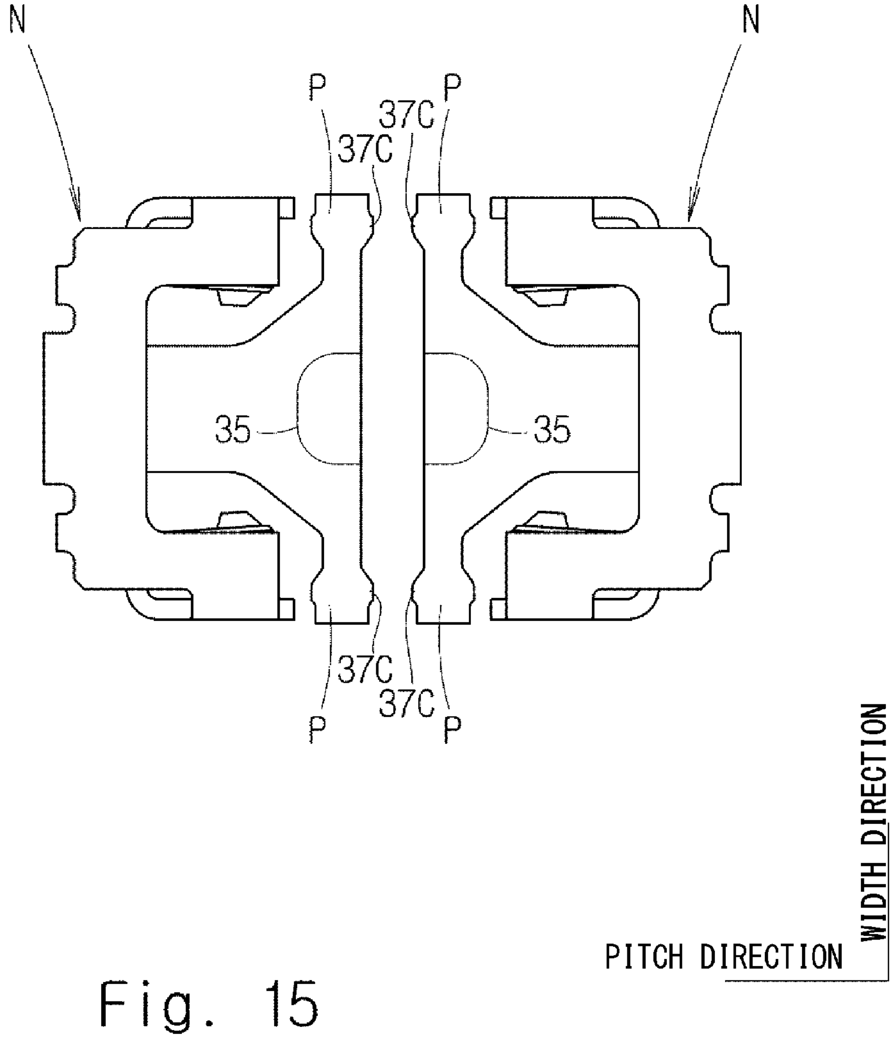
FIG. 15 is a plan view of the metal split body where a press-fit claw is formed.

S100:

FIGS. 12 and 13 show a metal plate M in a symmetrical shape in which a dome part 50 is formed by drawing. As shown in FIG. 12, two socket hold-downs 8 are manufactured in the state where they link together during the manufacturing process. Specifically, by punching and bending one metal plate M, the two hold-down main bodies 25 are formed to face each other in one metal plate M. Between the two hold-down main bodies 25, the dome part 50, two rear arm parts 38 that join the dome part 50 to two hold-down main bodies 25, respectively, and two extension parts 51 that extend outward in the width direction from the dome part 50 are formed. The two extension parts 51 extend to be away from each other in the width direction. Then, as shown in FIG. 14, the metal plate M is cut in such a way that the dome part 50 and the two extension parts 51 are split into two halves in the pitch direction. To be specific, in FIG. 13, the metal plate M is cut along a line of symmetry 52 to equally divide a projected area of the dome part 50 and the two extension parts 51 in a plan view in the pitch direction. As shown in FIG. 14, the metal plate M is thereby split in the pitch direction into two metal split bodies N having symmetrical shapes. Particularly, in the embodiment shown in FIG. 14, the two metal split bodies N have the same shape. At the same time, the dome part 50 becomes two half-dome parts 35. Each extension part 51 becomes two extension split bodies P. After that, the two extension split bodies P are punched along a dotted line shown in FIG. 14 by punching, and thereby the external press-fitting claw 37C is formed on each extension split body P as shown in FIG. 15. Then, a part of each extension split body P that is outward in the width direction is folded upward, so that the lateral arm part 36 and the press-fitting part 37 shown in FIG. 7 are formed.

Figure 16:
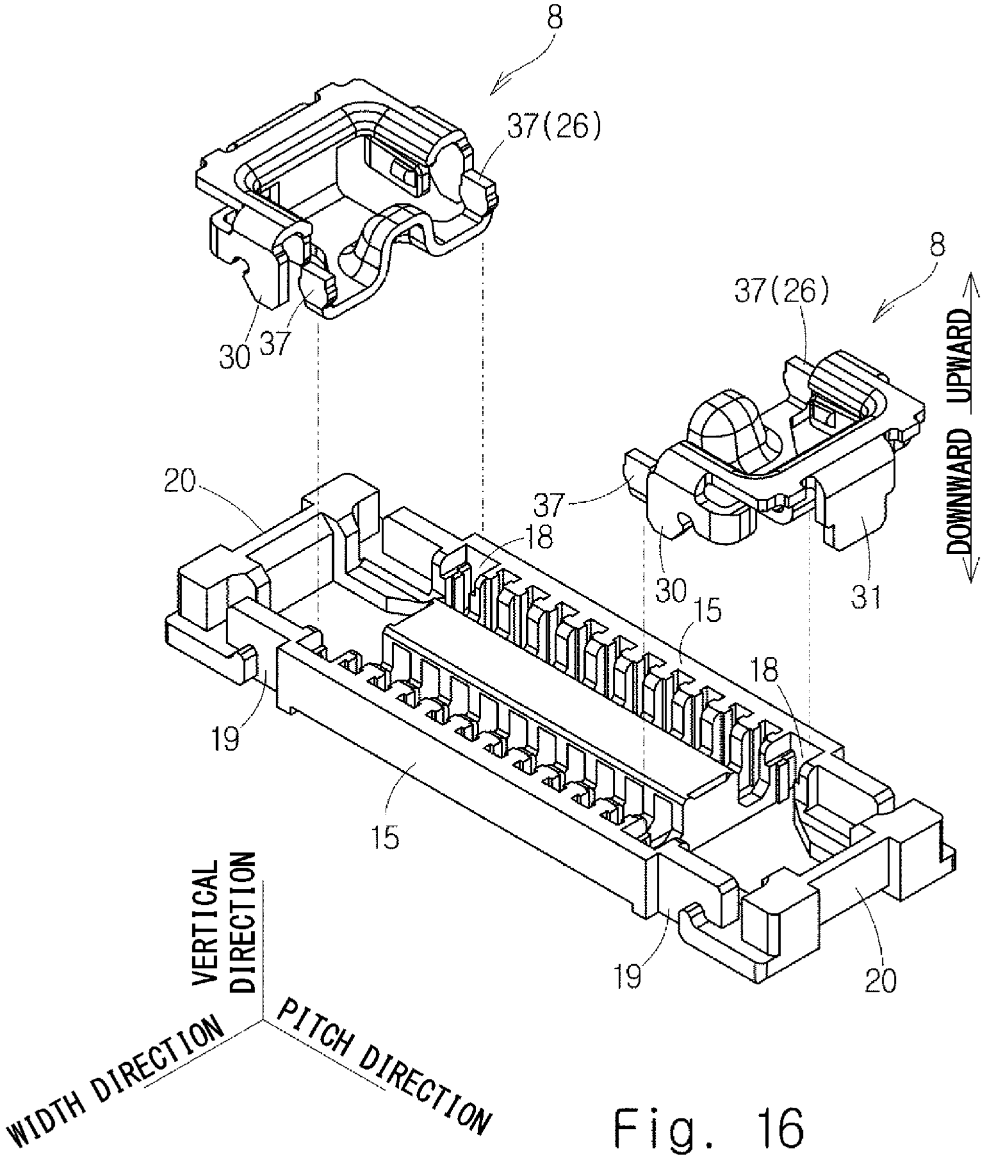
FIG. 16 is a perspective view of the socket hold-down being press-fit into the socket housing.
Figure 17:
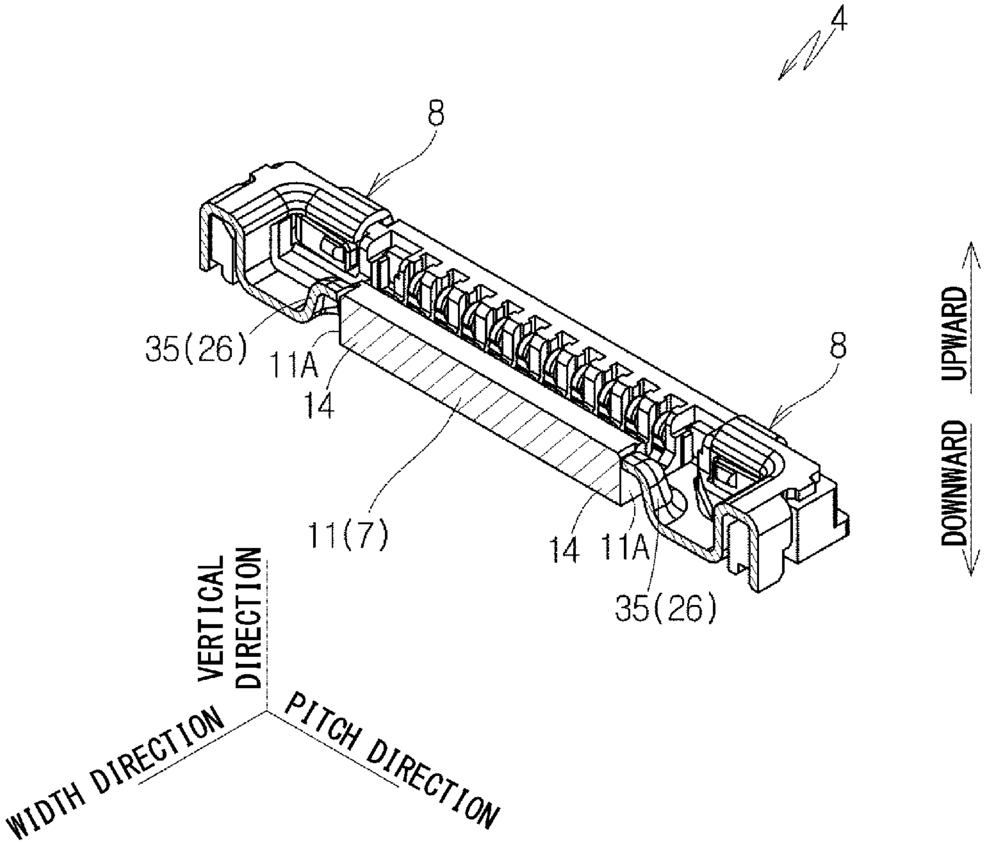
FIG. 17 is a cross-sectional perspective view of the socket connector.

S110:

Next, as shown in FIG. 16, each press-fitting part 37 of the protective metal fitting 26 of each socket hold-down 8 is press-fit into the corresponding inner press-fitting groove 18 of the socket housing 7. Simultaneously, each press-fitting soldering leg 30 of the hold-down main body 25 of each socket hold-down 8 is press-fit into the corresponding outer press-fitting groove 19 of the socket housing 7, and the insertion soldering leg 31 of the hold-down main body 25 of each socket hold-down 8 is inserted into the corresponding soldering leg accommodation groove 20 of the socket housing 7. Each socket hold-down 8 is thereby reliably held by the socket housing 7. FIG. 17 shows the way each socket hold-down 8 is held by the socket housing 7. As shown in FIG. 17, the half-dome part 35 of the protective metal fitting 26 of each socket hold-down 8 is disposed adjacent in the pitch direction to each island end part 14 of the island part 11 of the socket housing 7. Stated differently, the half-dome part 35 of the protective metal fitting 26 of each socket hold-down 8 is opposed in the pitch direction to both end faces 11A in the pitch direction of the island part 11 of the socket housing 7. Each island end part 14 of the island part 11 is thereby protected when mating the socket connector 4 with the plug connector 5.

(Plug Connector 5)

The plug connector 5 will be described hereinafter with reference to FIGS. 18 and 19. Note that since the position of the plug connector 5 relative to the socket connector 4 is univocally determined in the state where the plug connector 5 is mated with the socket connector 4, the directions already defined with reference to FIG. 1 will be used in the description of the plug connector 5 below.

Figure 18:
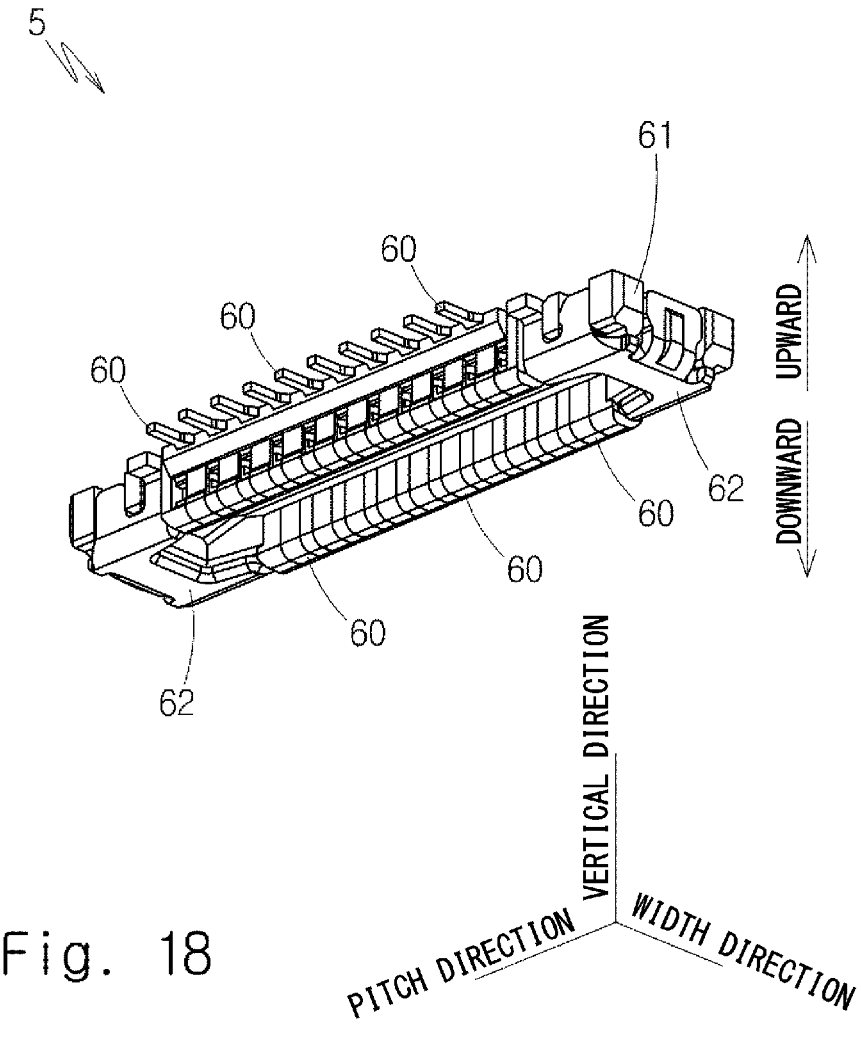
FIG. 18 is a perspective view of a plug connector.
Figure 19:
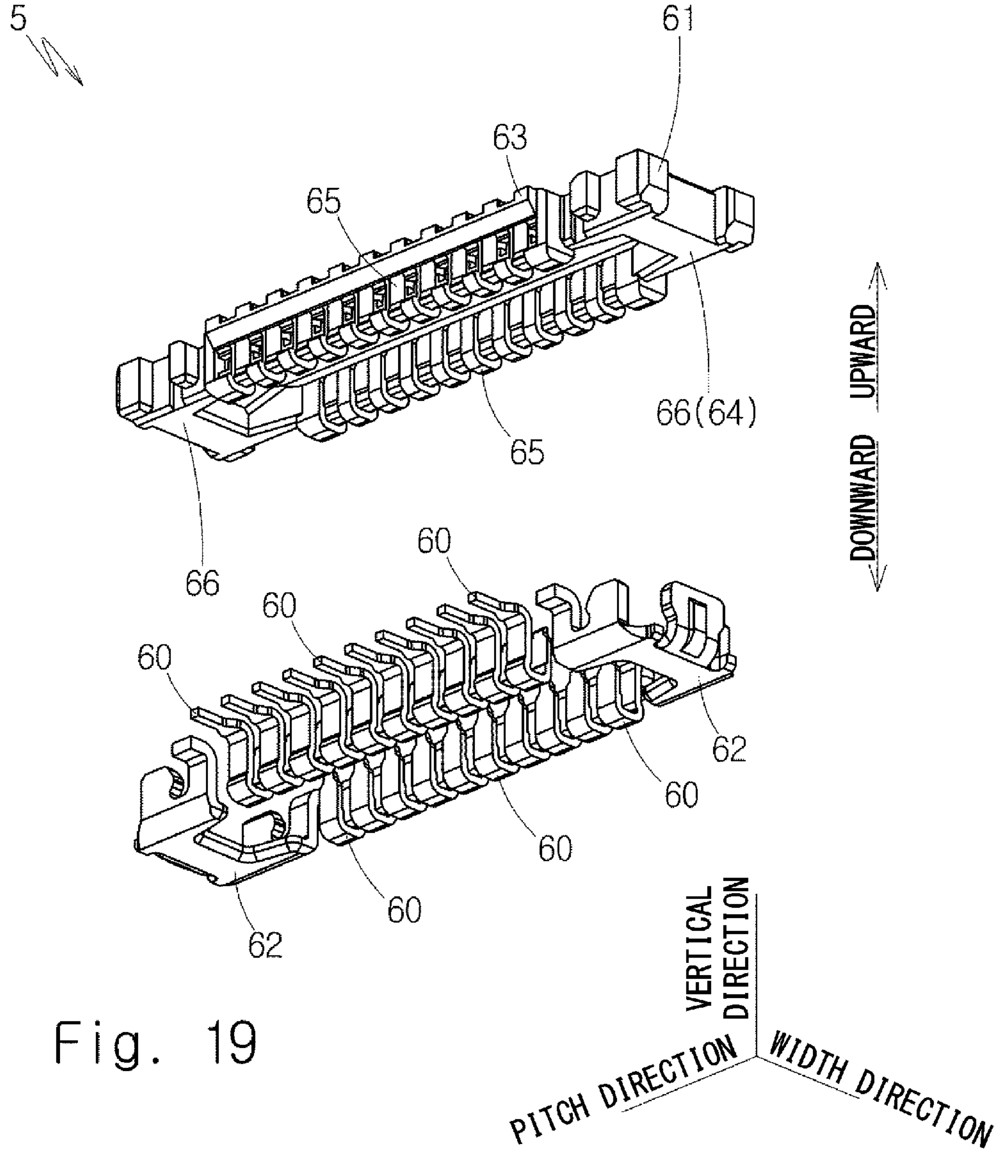
FIG. 19 is an exploded perspective view of the plug connector.
Figure 20:
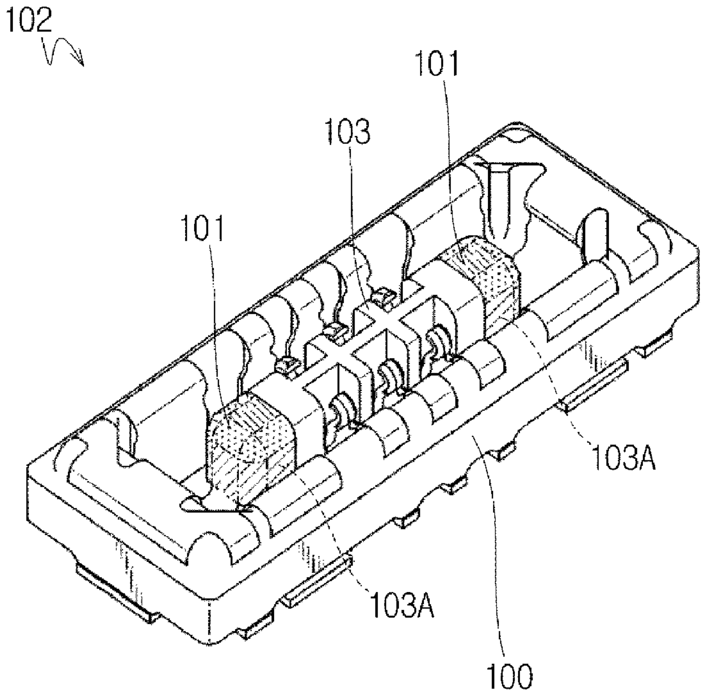
FIG. 20 is a view showing a simplified version of FIG. 6 of Japanese Unexamined Patent Application Publication No. 2022-070391.

As shown in FIGS. 18 and 19, the plug connector 5 includes a plurality of plug contacts 60, a plug housing 61 that holds the plurality of plug contacts 60, and two plug hold-downs 62. The plurality of plug contacts 60 are integrated with the plug housing 61 by insert-molding. The two plug hold-downs 62 are held by the plug housing 61.

As shown in FIG. 19, the plug housing 61 is a plate member made of an insulating resin, having a rectangular shape when viewed from above, and is elongated in the pitch direction. The plug housing 61 includes a bottom plate 63 and a peripheral wall 64.

The bottom plate 63 is a flat plate whose thickness direction is parallel to the vertical direction.

The peripheral wall 64 is annularly formed and projects downward from the bottom plate 63. The peripheral wall 64 includes two long walls 65 extending in the pitch direction and two short walls 66 extending in the width direction. The two long walls 65 hold the plurality of plug contacts 60 arranged in the pitch direction, respectively.

Each of the plug contacts 60 is formed by punching and bending one metal plate.

The two plug hold-downs 62 are provided to fix the plug housing 61 to the connector mounting surface 2A of the plug side board 2. Each of the plug hold-downs 62 is formed by punching and bending one metal plate.

(Use)

How to use the connector assembly 3 will be described hereinbelow.

In order to mount the socket connector 4 shown in FIG. 1 on the connector mounting surface 1A of the socket side board 1, the soldering part 30B of the two press-fitting soldering legs 30 and the lower end 31A of the insertion soldering leg 31 of the hold-down main body 25 of each socket hold-down 8 are soldered to pads, which are not shown, formed on the connector mounting surface 1A of the socket side board 1, respectively. At the same time, the plurality of socket contacts 6 of the socket connector 4 are soldered to electrode pads, which are not shown, formed on the connector mounting surface 1A of the socket side board 1, respectively.

Likewise, in order to mount the plug connector 5 on the connector mounting surface 2A of the plug side board 2, a soldering part 62A of each plug hold-down 62 is soldered to pads, which are not shown, formed on the connector mounting surface 2A of the plug side board 2, respectively. At the same time, the plurality of plug contacts 60 of the plug connector 5 are soldered to electrode pads, which are not shown, formed on the connector mounting surface 2A of the plug side board 2, respectively.

In order to mate the plug connector 5 with the socket connector 4, the plug connector 5 is moved downward toward the socket connector 4 in the state where the plug connector 5 is opposed to the socket connector 4 in the vertical direction, so that the plug connector comes into contact with the socket connector 4. Next, the plug connector 5 is moved in reciprocating fashion in the pitch direction and the width direction relative to the socket connector 4 as the plug connector 5 is pressed against the socket connector 4. By this reciprocating motion, the annular peripheral wall 64 of the plug housing 61 of the plug connector 5 is loosely mated with the annular mating recessed part 21 of the socket housing 7 of the socket connector 4.

During the above reciprocating motion, the plug hold-down 62 of the plug connector 5 repeatedly gets closer to and away from the island part 11 of the socket connector 4 in the pitch direction. However, as shown in FIG. 2, since the half-dome parts 35 of the two socket hold-downs 8 are disposed outward in the pitch direction of the two island end parts 14 of the island part 11, respectively, the plug hold-down 62 of the plug connector 5 does not directly collide with the island part 11 of the socket connector 4 in the pitch direction, and therefore the two island end parts 14 of the island part 11 are not damaged during mating.

Then, the annular peripheral wall 64 of the plug housing 61 of the plug connector 5 is pressed into the annular mating recessed part 21 of the socket housing 7 of the socket connector 4, and thereby the plurality of plug contacts 60 and the plurality of socket contacts 6 are electrically connected to one another. Simultaneously, each plug hold-down 62 is inserted between the two spring pieces 29 of the corresponding socket hold-down 8 while pushing the two spring pieces 29 aside and outward in the width direction. As a result, the two plug hold-downs 62 and the two socket hold-downs 8 are electrically connected to one another.

The plug connector 5 is removable from the socket connector 4 simply by pulling the plug connector 5 upward from the socket connector 4.

A preferred embodiment of the present disclosure is described above, and the above-described embodiment has the following features.

As shown in FIGS. 2 to 9, the socket connector 4 includes the socket housing 7 (housing) in which the island part 11 and the peripheral wall 12 surrounding the island part 11 project upward from the bottom plate 10, the plurality of socket contacts 6 (contacts) arranged in the socket housing 7, and the two protective metal fittings 26. As shown in FIG. 6, the peripheral wall 12 includes the two long walls 15 extending in the pitch direction of the plurality of socket contacts 6. As shown in FIGS. 7 to 10 and 17, each of the protective metal fittings 26 includes the half-dome part 35 (protective part) placed at the island end part 14 being an end of the island part 11 in the pitch direction for protecting the island end part 14, the two lateral arm parts 36 (arm parts) extending from the half-dome part 35 toward the two long walls 15, respectively, and the two press-fitting parts 37 placed at the distal ends 36A of the two lateral arm parts 36 and to be press-fit into the two long walls 15, respectively. As shown in FIG. 11, a method of manufacturing the above-described socket connector 4 includes the cutting step (S100) and the press-fitting step (S110). In the cutting step, as shown in FIGS. 12 to 14, the half-dome part 35 (protective part) of the two protective metal fittings 26 is formed by cutting the metal plate M in such a way that the dome part 50 in a symmetrical shape formed by drawing in the metal plate M is split into two halves along the line of symmetry 52. In the press-fitting step, as shown in FIG. 16, the two press-fitting parts 37 of each socket hold-down 8 are press-fit into the two long walls 15, respectively.

As described above, when manufacturing the two socket hold-downs 8, the two half-dome parts 35 are formed by splitting into two halves the dome part 50 formed in one metal plate M by drawing, and thereby man-hours for drawing are reduced to one-half compared with a case of forming the two half-dome parts 35 separately by drawing, which reduces the manufacturing cost of the two socket hold-downs 8. Although this manufacturing method is most suitable for the manufacturing of the two socket hold-downs 8 in the same shape facing each other as shown in FIGS. 4 and 15, it is also suitable for the manufacturing of two socket hold-downs having symmetrical shapes split along the axis of symmetry, and is also effective for the manufacturing of two socket hold-downs where only the half-dome parts serving as the protective parts have symmetrical shapes, not limited to socket hold-downs having the same shapes. Further, when holding the two socket hold-downs 8 to the socket housing 7, the two socket hold-downs 8 are attached to the socket housing 7 by press-fitting rather than integrating them by insert molding, which eliminates the need for an expensive mold for insert molding. Furthermore, since the structure where the half-dome part 35 is supported by the two lateral arm parts 36 is applied, the protective metal fitting 26 is firmly held to the socket housing 7 compared with the structure where the lower end, which is thin due to insert molding, of the half-dome part 35 is press-fit into the bottom plate 10 of the socket housing 7. Therefore, according to the above-described method, it is capable of firmly holding, to the socket housing 7, the protective metal fitting 26 for protecting the island part 11 of the socket housing 7, as well as reducing the cost of the socket connector 4.

Further, as shown in FIGS. 2 to 9, the socket connector 4 includes the socket housing 7 (housing) where the island part 11 and the peripheral wall 12 surrounding the island part 11 project upward from the bottom plate 10, the plurality of socket contacts 6 (contacts) arranged in the socket housing 7, and the two protective metal fittings 26. As shown in FIG. 6, the peripheral wall 12 includes the two long walls 15 extending in the pitch direction of the plurality of socket contacts 6. As shown in FIGS. 7 to 10 and 17, each of the protective metal fittings 26 includes the half-dome part 35 (protective part) placed at the island end part 14 being an end of the island part 11 in the pitch direction for protecting the island end part 14, the two lateral arm parts 36 (arm parts) extending from the half-dome part 35 toward the two long walls 15, respectively, and the two press-fitting parts 37 placed at the distal ends 36A of the two lateral arm parts 36 and to be press-fit into the two long walls 15, respectively. The half-dome part of the two protective metal fittings 26 have symmetrical shapes facing each other.

As described above, when holding the two socket hold-downs 8 to the socket housing 7, the two socket hold-downs 8 are attached to the socket housing 7 by press-fitting rather than integrating them by insert molding, which eliminates the need for an expensive mold for insert molding. Furthermore, since the structure where the half-dome part 35 is supported by the two lateral arm parts 36 is applied, the protective metal fitting 26 is firmly held to the socket housing 7. Therefore, according to the above-described method, it is capable of firmly holding, to the socket housing 7, the protective metal fitting 26 for protecting the island part 11 of the socket housing 7, as well as reducing the cost of the socket connector 4.

The socket connector 4 further includes the two socket hold-downs 8. Each of the two socket hold-downs 8 includes each protective metal fitting 26 and the soldering leg 28 to be soldered to the socket side board 1. The two socket hold-downs 8 have symmetrical shapes facing each other. In this structure, the manufacturing cost of the two socket hold-downs 8 is reduced.

Further, as shown in FIGS. 7 to 9, each of the two lateral arm parts 36 extends along the width direction being a direction perpendicular to the pitch direction. This structure contributes to downsizing of the socket connector 4 in the pitch direction compared with a structure in which the two lateral arm parts 36 extend at an angle from the width direction when viewed from above.

Further, as shown in FIGS. 7 and 8, each of the two lateral arm parts 36 extends from a lower end of the half-dome part 35. In this structure, the two lateral arm parts 36 extend on the underside of the annular mating recessed part 21 shown in FIG. 1, so that the two lateral arm parts 36 do not interfere with the mating of the plug connector 5 and the socket connector 4.

Further, as shown in FIGS. 7 and 8, the two press-fitting parts 37 project upward from the distal ends 36A of the two lateral arm parts 36, respectively. A structure in which the two press-fitting parts 37 extend in the vertical direction is thereby achieved.

Further, as shown in FIG. 16, the two long walls 15 respectively have the inner press-fitting grooves 18 (press-fitting grooves) that open upward and downward. The two press-fitting parts 37 are respectively press-fit into the inner press-fitting grooves 18 of the two long walls 15. A structure in which the two press-fitting parts 37 are press-fit from above is thereby achieved.

Further, as shown in FIG. 10, each press-fitting part 37 has the internal press-fitting claw 37B and the external press-fitting claw 37C, which are two press-fitting claws projecting opposite to each other in the pitch direction. In this structure, each press-fitting part 37 bites into the inner wall surface of the corresponding inner press-fitting groove 18 at two positions, which allows each press-fitting part 37 to be reliably press-fit into the corresponding inner press-fitting groove 18.

Further, the internal press-fitting claw 37B and the external press-fitting claw 37C of each press-fitting part 37 have the inclined surface 37E and the inclined surface 37G that are inclined to approach each other downward. In this structure, each press-fitting part 37 has an arrowhead shape that is tapered as it goes downward.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A method of manufacturing a socket connector,
the socket connector comprising:
a housing in which an island part and a peripheral wall surrounding the island part project upward from a bottom plate;
a plurality of contacts arranged in the housing; and
two protective metal fittings,
the peripheral wall including two long walls extending in a pitch direction of the plurality of contacts, and
each of the protective metal fittings including
a protective part placed at an island end part being an end of the island part in the pitch direction for protecting the island end part,
two arm parts extending from the protective part toward the two long walls, respectively, and
two press-fitting parts placed at distal ends of the two arm parts and to be press-fit into the two long walls, respectively, and
the method comprising:
a cutting step of forming the protective part of the two protective metal fittings by cutting a metal plate in such a way that a dome part in a symmetrical shape formed by drawing in the metal plate is split into two halves along a line of symmetry; and
a press-fitting step of press-fitting the two press-fitting parts into the two long walls, respectively.

2. A socket connector comprising:
a housing in which an island part and a peripheral wall surrounding the island part project upward from a bottom plate;
a plurality of contacts arranged in the housing; and
two protective metal fittings, wherein
the peripheral wall includes two long walls extending in a pitch direction of the plurality of contacts,
each of the protective metal fittings includes
a protective part placed at an island end part being an end of the island part in the pitch direction for protecting the island end part,
two arm parts extending from the protective part toward the two long walls, respectively, and
two press-fitting parts placed at distal ends of the two arm parts and to be press-fit into the two long walls, respectively, and
the protective parts of the two protective metal fittings have symmetrical shapes facing each other, and wherein
the two long walls respectively have press-fitting grooves opening upward and downward, and the two press-fitting parts are respectively press-fit into the press-fitting grooves of the two long walls,
each of the press-fitting parts has two press-fitting claws projecting opposite to each other in the pitch direction, and
wherein each of the press-fitting parts bites into the inner wall surface of the corresponding inner press-fitting groove at two positions.

3. The socket connector according to claim 2, further comprising:
two socket hold-downs, wherein
each of the socket hold-downs includes each of the protective metal fittings and a soldering leg to be soldered to a socket side board, and
the two socket hold-downs have symmetrical shapes facing each other.

4. The socket connector according to claim 2, wherein each of the two arm parts extends along a direction perpendicular to the pitch direction.

5. The socket connector according to claim 2, wherein each of the two arm parts extends from a lower end of the protective part.

6. The socket connector according to claim 2, wherein the two press-fitting parts project upward from distal ends of the two arm parts, respectively.

7. The socket connector according to claim 2, wherein the two press-fitting claws of each of the press-fitting parts have inclined surfaces inclined to approach each other downward.

* * * * *